M. W. Gunn's Harrow.

No. 74348 — Patented Feb 11 1868

United States Patent Office.

M. W. GUNN, OF LA SALLE, ILLINOIS.

Letters Patent No. 74,348, dated February 11, 1868.

IMPROVEMENT IN HARROWS.

The Schedule referred to in these Letters Patent and making part of the same.

TO ALL WHOM IT MAY CONCERN:

Be it known that I, M. W. GUNN, of La Salle, in the county of La Salle, and State of Illinois, have invented a new and useful Improvement in Harrows; and I do hereby declare that the following is a full, clear, and exact description thereof, which will enable those skilled in the art to make and use the same, reference being had to the accompanying drawings, forming part of this specification, in which—

My invention has for its object to furnish a simple, cheap, and durable harrow, designed especially for harrowing or cultivating crops planted in hills and drills, but equally adapted to every kind of farm-harrowing, which shall be so constructed that its forward end may be easily guided so as to straddle the hills or rows, and the forward and rear ends of which may be easily raised to clear it of rubbish, or to pass over obstructions; and it consists in the construction, combination, and arrangement of the various parts, as hereinafter more fully described.

Figure 1:
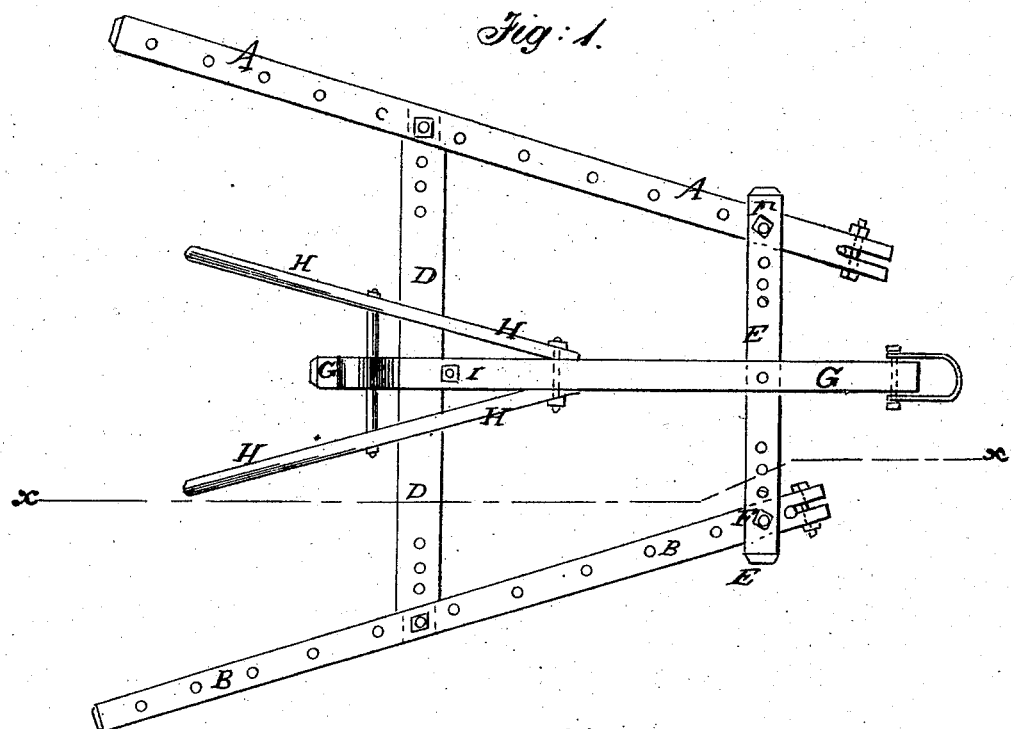
Figure 1 is a top view of my improved harrow.
Figure 2:
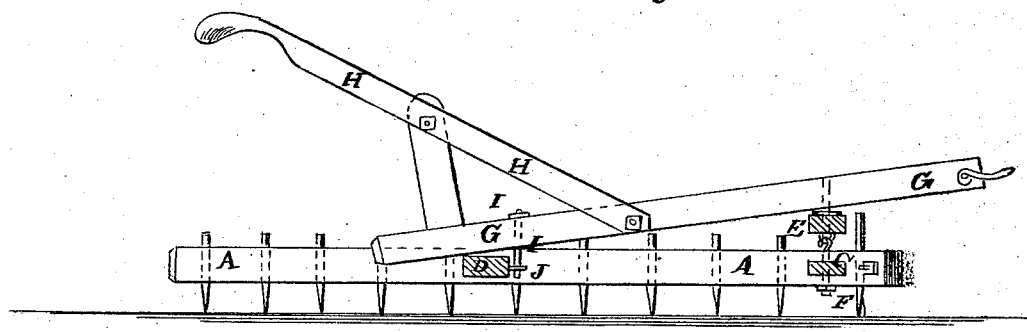
Figure 2 is a longitudinal section of the same, taken through the line $x\ x$, fig. 1.

A and B are the side pieces of the harrow, one of which is made longer than the other, so that the forward tooth of the one side piece may be set four or five inches in advance of the other, as shown in fig. 1, so that the said forward teeth may be less liable to clog with rubbish than they would be if set abreast of each other. The side bars A and B are slotted from their forward ends to the holes in which the front teeth are placed, said teeth being secured in place by bolts passing through the slotted ends of the said side bars. This construction enables their forward teeth to be easily and quickly adjusted and clamped, to run at any desired depth. The other teeth are attached to the side bars or pieces A and B, in the ordinary manner. The side pieces A and B are connected at their forward and central parts by the cross-bars C and D, which pass through mortises or slots in said bars, and which are secured in place by bolts, which pass through holes in the side bars A and B, and through one or the other of the holes formed in the said cross-bars. This construction enables either or both ends of the said side pieces to be set nearer together or farther apart, according to the particular work to be done. E is a bar, of the same length as the forward cross-bar C, but heavier, which is connected or hinged to the forward parts of the side bars A and B, by eye-bolts F, or equivalent connections, so that the bar E may rock freely upon its seat. Several holes are formed, through the ends of the bar E, for the reception of the upper eye-bolts, so that their positions may be adjusted according as the forward ends of the bars A and B are adjusted nearer together or farther apart. G is a lever, which is loosely pivoted to the cross-bar E, by a bolt passing through the said lever and said cross-bar, and to the forward end of which the draught is applied. The rear end of the lever G extends back so as to be easily reached and operated by the driver. To enable this to be more readily done, handles H, similar to plough-handles, are attached to the rear part of the lever G, as shown in figs. 1 and 2. By this arrangement of the lever G, by simply moving the rear end of said lever G to the right or to the left, the relative position of the draught-point may be varied at pleasure, so as to guide the forward ends of the side bars A and B, according to the position of the hills and the irregularities of the rows or drills. By raising the rear end of the lever G, the forward ends of the side bars A and B will be raised from the ground, to clear them of rubbish, or to pass over an obstruction or irregular hill. To the rear part of the lever G, upon its under side, is attached a hook, I, projecting downward, and to the forward side of the central part of the cross-bar D is attached a pin, J, so that by hooking the hook I upon the pin J, and raising the rear end of the lever G, the rear ends of the side bars A and B will be raised to clear them of rubbish, or enable them to pass over obstructions, and by raising the rear end of the lever G higher, the entire harrow will be raised from the ground.

Having thus described my invention, I claim as new, and desire to secure by Letters Patent—

1. The combination of the adjustable cross-bars C, rocking cross-bar E, adjustable cross-bar D, pin J, and hook I, with the pivoted lever G and side bars A B, as herein described for the purpose specified.

2. Adjustably securing or clamping the forward teeth of the side bars A and B in the slotted forward ends of said side bars, substantially as herein shown and described, and for the purpose set forth.

M. W. GUNN.

Witnesses:
    L. WESTHEIM,
    JOSEPH LEVI.